Patented Aug. 28, 1923.

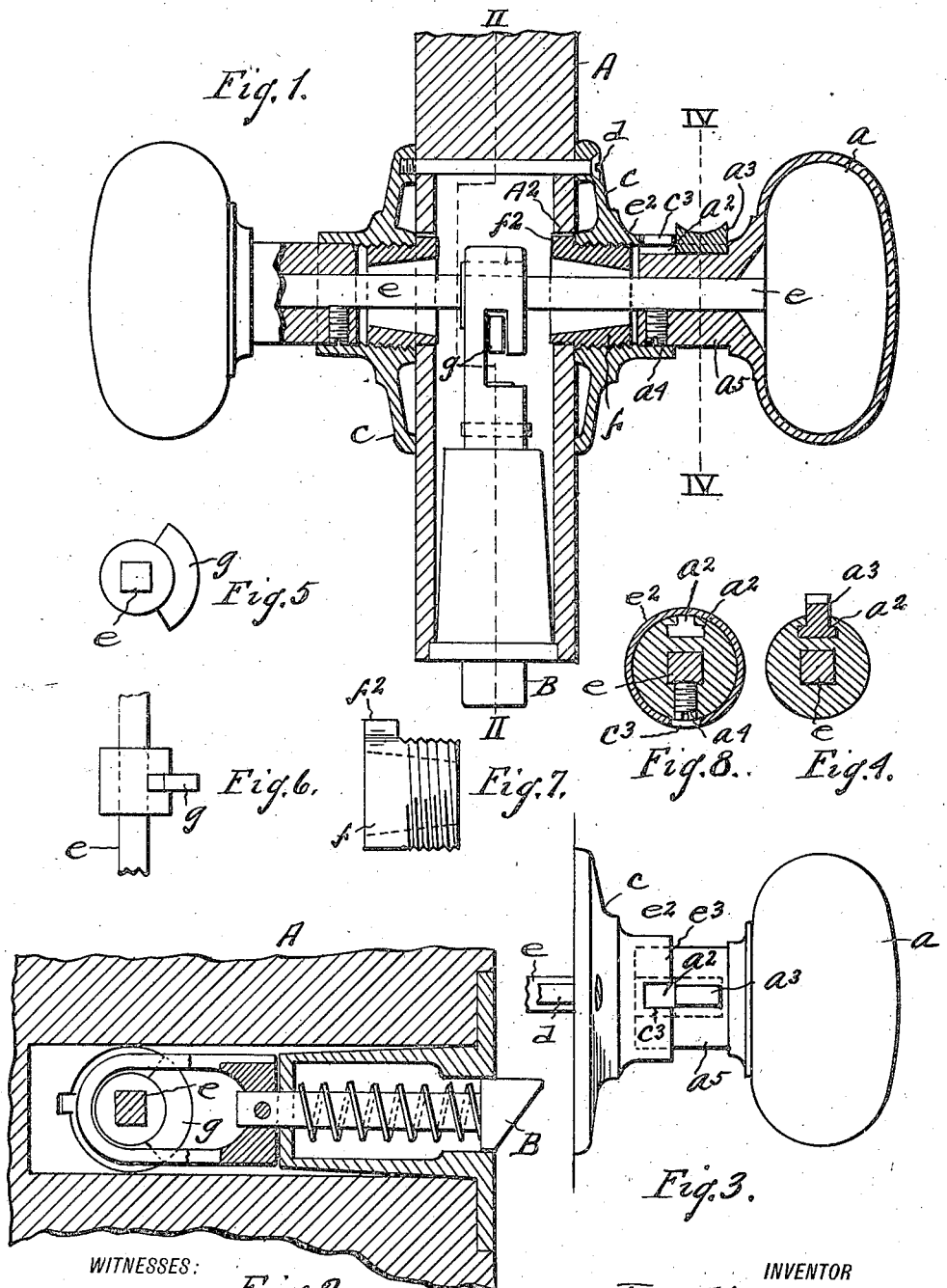

1,466,369

UNITED STATES PATENT OFFICE.

JOHN MONTGOMERY, OF TORONTO, ONTARIO, CANADA.

KNOB LOCK.

Application filed February 26, 1919. Serial No. 279,360.

*To all whom it may concern:*

Be it known that I, JOHN MONTGOMERY, a subject of the King of Great Britain, residing at Toronto, county of York, Province of Ontario, Canada, have invented a certain new and useful Improvement in Knob Locks, and declare the following to be a full, clear, and exact description of the same, such as will enable others skilled in the art to which it pertains to make and use the same, reference being had to the accompanying drawings, which form a part of this specification.

My invention relates to knob locks and an object of my improvements is to provide a cheap and effective means for locking the knob of a door.

I secure this object in the device illustrated in the accompanying drawings in which, Figure 1 is a sectional view of a knob lock therefor embodying my invention.

Figure 2 is a section on the line II—II Fig. 1.

Figure 3 is a plan view of the knob and lock.

Figure 4 is a section of the line IV—IV Fig. 1.

Figure 5 is a detail view illustrating the bolt actuating cam.

Figure 6 is a plan view of the same.

Figure 7 is a side elevation of the sleeve bearing for the escutcheon.

Fig. 8 is a section similar to that of Fig. 4 but taken on a plane through the axis of the set-screw $a^4$.

A is a door of a usual construction and B is a latching and locking bolt. $e$ is the usual knob spindle by which the bolt B is actuated by any form of mechanism such as the lug $g$. $a$ is a knob secured to the spindle $e$ in the usual way by a set screw $a^4$ passing radially thru its shank $a^5$ and engaging said spindle. $a^2$ is a dovetailed slot at the periphery of the shank $a^5$ extending parallel to the axis of the shank. $c$ is an escutcheon extending over the shank $a^5$ and surrounding the same and over the inner end of the slot $a^2$. $a^3$ is a bolt fitting in the dovetailed slot $a^2$ and extending above the surface of the shank $a^5$. This is formed at its upper edge to be engaged by the thumb or finger of the operator. The bolt $a^3$ is enlarged at its inner portion so as to fit in the enlarged inner portion of the dovetailed slot $a^2$. $c^3$ is a slot extending inward from the edge of the cylindrical portion of the escutcheon which extends over the shank $a^5$ and over the inner end of the slot $a^2$. In the normal position of the parts the slot $c^3$ registers with the slot $a^2$ and forms an extension of the narrow upper portion of the same. The bolt $a^3$ may slide in the slot $a^2$ to clear the escutcheon $c$ completely, in which case the knob is free to turn, or it may be thrust forward by the finger of the operator to engage in the slot $c^2$ in which case the shank $a^5$ is locked by the engagement of the bolt $a^3$ in the slots $c^3$ and $a^2$, thus preventing the relative angular movement of said parts.

The sleeve, or bearing, $f$ is screw-threaded around its outer periphery and has a lug $f^2$ which fits into a lug $A^2$ in the door to hold said sleeve from rotation. Each of the escutcheons $c$ is provided with a central aperture with screw-threads adapted to engage the threads upon a sleeve $f$. There is a screw $d$ which extends thru a screw hole near the periphery of the escutcheon $c$ and extends thru the door engaging the corresponding escutcheon on the other side of the door.

By this construction the escutcheons can be adjusted accurately to the surface of the doors of various thicknesses by turning them upon the sleeve and screwing them in or out as may be required. When adjusted to the proper position one or more screws $d$ are inserted in place and tightened and holds the escutcheon in its adjusted position.

The sleeves may be accurately fitted in the apertures of the door and the escutcheons bear all around their periphery.

What I claim is:

1. In a device of the class described, the combination with a door having a transversely extending aperture in each surface thereof, said apertures being co-axial with each other, a screw threaded sleeve engaging in each of said apertures, an escutcheon upon each side of said door having internal screw threads engaging the screw threads of said sleeves, a spindle passing axially through said sleeves, the bores of said sleeves being large enough to permit sufficient clearance between said walls and said spindle, a knob fixed upon each end of said spindle and rotatably bearing in the adjacent escutcheon.

2. In a device of the class described, the combination with a door having a transversely extending aperture in each surface thereof, said apertures being co-axial with each other, a screw threaded sleeve engaging in each of said apertures, an escutcheon upon each side of said door having internal screw threads engaging the screw threads of said sleeves, a spindle passing axially through said sleeves, the bores of said sleeves being large enough to permit sufficient clearance between said walls and said spindle, a knob fixed upon each end of said spindle and rotatably bearing in the adjacent escutcheon and a screw engaging each of said escutcheons and the door to prevent rotation of the escutcheon.

3. The combination of claim 1, one of said apertures being provided with a slot in its wall opening outward and said sleeve having a lug adapted to be inserted into said slot from the outside and closely engage therein.

In testimony whereof, I sign this specification.

JOHN MONTGOMERY.